United States Patent
Klinker et al.

(10) Patent No.: US 10,621,258 B2
(45) Date of Patent: Apr. 14, 2020

(54) MULTIPROVIDER PAGING THROUGH A CENTRAL HUB SYSTEM

(71) Applicant: SAP SE, Walldorf (DE)

(72) Inventors: Boris Klinker, Karlsruhe (DE); Ronald Trump, Wiesloch (DE); Harald Schubert, Mannheim (DE)

(73) Assignee: SAP SE, Walldorf (DE)

( * ) Notice: Subject to any disclaimer, the term of this patent is extended or adjusted under 35 U.S.C. 154(b) by 538 days.

(21) Appl. No.: 15/159,608

(22) Filed: May 19, 2016

(65) Prior Publication Data

US 2017/0337288 A1 Nov. 23, 2017

(51) Int. Cl.
*G06F 16/954* (2019.01)
*G06F 16/957* (2019.01)
*G06F 16/9535* (2019.01)

(52) U.S. Cl.
CPC .......... *G06F 16/954* (2019.01); *G06F 16/957* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 8,832,086 B1* | 9/2014 | Zhang | G06F 17/30991 705/346 |
| 2006/0004715 A1* | 1/2006 | Lock | G06F 17/30327 |
| 2007/0203888 A1* | 8/2007 | Wang | G06F 16/951 |
| 2009/0157600 A1* | 6/2009 | Woolf | G06F 17/30545 |
| 2014/0046950 A1* | 2/2014 | Zelek | G06F 17/30492 707/741 |
| 2014/0123001 A1* | 5/2014 | M | G06F 17/217 715/251 |
| 2016/0203183 A1* | 7/2016 | Katakawa | H04L 67/1008 707/718 |

* cited by examiner

Primary Examiner — Tony Mahmoudi
Assistant Examiner — Umar Mian
(74) Attorney, Agent, or Firm — Mintz Levin Cohn Ferris Glovsky and Popeo, P.C.

(57) ABSTRACT

Consolidated lists of items provided by or generated based on data provided by multiple provider systems can be presented, at a requestor system, in a series of pages. Navigation between pages in the series of pages can occur with a re-querying of the multiple provider systems in a manner that correctly populates the requested new page to reflect up to date information about the items that belong on that page.

17 Claims, 11 Drawing Sheets

| KB6 ID | Attr1 | Attr2 | Attr3 | ... | Attrn | ID |
|---|---|---|---|---|---|---|
| | ASC: > DESC: < | N/A | N/A | N/A | N/A | N/A |
| | = | ASC: > DESC: < | N/A | N/A | N/A | N/A |
| | = | = | ASC: > DESC: < | N/A | N/A | N/A |
| | = | = | = | ASC: > DESC: < | N/A | N/A |
| | = | = | = | = | ASC: > DESC: < | N/A |
| | = | = | = | = | = | > or >= (strongly ordered item identifier that is lexicographically sortable) |

| ITEM ID | PRIORITY | STATUS |
|---|---|---|
| 3 | 1 | OPEN |
| 1 | 2 | OPEN |
| 2 | 3 | COMPLETED |

| ITEM ID | PRIORITY | STATUS |
|---|---|---|
| 6 | 1 | OPEN |
| 1 | 2 | OPEN |
| 5 | 3 | IN PROCESS |

| PROVIDER | ITEM_ID | PRIORITY | STATUS |
|---|---|---|---|
| A | 3 | 1 | OPEN |
| B | 6 | 1 | OPEN |
| A | 1 | 2 | OPEN |
| B | 1 | 2 | OPEN |
| A | 2 | 3 | COMPLETED |
| B | 5 | 3 | IN PROCESS |

| PROVIDER | ITEM_ID | PRIORITY | STATUS |
|---|---|---|---|
| A | 3 | 1 | OPEN |
| B | 6 | 1 | OPEN |
| A | 1 | 2 | OPEN |

Query Parameters
PRIORITY > 2
OR
PRIORITY = 2 AND STATUS > OPEN
OR
PRIORITY = 2 AND STATUS = OPEN AND ITEM_ID > 1

Sorting Parameters
ITEM_ID ASCENDING
PRIORITY ASCENDING
STATUS ASCENDING

*FIG. 7A*

| ITEM_ID | PRIORITY | STATUS |
|---|---|---|
| 2 | 3 | COMPLETED |
| 5 | 3 | IN_PROCESS |
| 4 | 4 | OPEN |

*FIG. 7B*

Query Parameters
PRIORITY > 2
OR
PRIORITY = 2 AND STATUS > OPEN
OR
PRIORITY = 2 AND STATUS = OPEN AND ITEM_ID >= 1

Sorting Parameters
ITEM_ID ASCENDING
PRIORITY ASCENDING
STATUS ASCENDING

| ITEM_ID | PRIORITY | STATUS |
|---------|----------|--------|
| 1 | 2 | OPEN |
| 5 | 3 | IN_PROCESS |
| 7 | 4 | COMPLETED |

Query Parameters
PRIORITY < 2
OR
PRIORITY = 2 AND STATUS < OPEN
OR
PRIORITY = 2 AND STATUS = OPEN AND ITEM_ID < 1

Sorting Parameters
PRIORITY DESCENDING
STATUS DESCENDING

1000

Query Parameters
PRIORITY < 2
OR
PRIORITY < 2 AND STATUS < OPEN
OR
PRIORITY = 2 AND STATUS = OPEN AND ITEM_ID <= 1

Sorting Parameters
PRIORITY DECENDING
STATUS DESCENDING

1050

MULTIPROVIDER PAGING THROUGH A CENTRAL HUB SYSTEM

TECHNICAL FIELD

The subject matter described herein relates to providing consistent paging within a list that presents a unified, filterable, and sortable view of content from multiple backend or provider systems.

BACKGROUND

Data integration software, such as for example programs capable of presenting, in a unified user interface view, data items provided by multiple computing systems (e.g. enterprise resource planning systems or the like), can aggregate and present a list of such items to a user. This list of items is also referred to herein as a consolidated list. The consolidated list can, in some examples, include tasks, documents, action items, etc. A consolidated list presented to one user of the data integration software may differ at least partially from a second consolidated list presented to another user of the data integration software. Due to overlap of at least some items between consolidated lists presented to two or more users, actions by one user can impact the state of an item that is also presented in the consolidated list of another user.

SUMMARY

In one aspect, a method includes querying a plurality of provider systems for a set of items to be included in a consolidated list for presentation as a series of pages to a user at a requestor system, merging results received from the plurality of provider systems to create a single list of items sorted according to one or more filtering and/or sorting criteria (which are provided as part of the querying) applied to attributes of the items, truncating the single list to include a number of items equal to a page size defined by the requestor system, and providing the truncated single list for display at the requestor system as a current page. The method further includes re-querying the plurality of provider systems in response to a navigation command received at the requestor system. The re-querying includes dynamically generating a new truncated single list that includes updated items to appear on a page requested by the navigation command.

In some variations one or more of the following features can optionally be included in any feasible combination. The navigation command can include a request to navigate to a next page in the series of pages, in which case the re-querying of the plurality of provider systems can include requesting that a provider system of the plurality of provider systems from which a last item on the current page was received provides next items according to the one or more filtering and/or sorting criteria starting from but excluding the attributes of the last item and that any other provider systems of the plurality of provider systems provide next items starting from the attributes corresponding to the last item. The navigation command can include a request to navigate to a preceding page in the series of pages, in which case the re-querying of the plurality of provider systems can include requesting that a provider system of the plurality of provider systems from which a first item on the current page was received provides preceding items according to the one or more filtering and/or sorting criteria ending at but excluding the attributes of the first item and that any other provider systems of the plurality of provider systems provide preceding items ending at the attributes corresponding to the first item.

The querying can include requesting, from each provider system of the plurality of provider systems, a number of items equal to the page size that match the one or more filtering and/or sorting criteria provided from the requestor system. The filtering and/or sorting criteria can include sorting criteria that include an ordering of item identifiers for items at the plurality of provider systems. The item identifiers need not be globally unique across all of the plurality of provider systems.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 shows a table that includes examples of building rules for provider system queries consistent with implementations of the current subject matter;

FIG. 5A and FIG. 5B respectively show tables listing what is returned according to a page size for each provider system consistent with an example implementation of the current subject matter;

FIG. 6A and FIG. 6B respectively show a table with a full result list from the example implementation and a table with the result list truncated to the length of a page;

FIG. 7A and FIG. 7B respectively show a listing of query and sorting parameters sent to a provider system that provided a last item on the current page and a table with a result of this query for a next page in the series of pages consistent with the example implementation;

FIG. 8A and FIG. 8B respectively show a listing of query and sorting parameters sent to a provider system that did not provide a last item on the current page and a table with a result of this query for a next page in the series of pages consistent with the example implementation;

When practical, similar reference numbers denote similar structures, features, or elements.

DETAILED DESCRIPTION

Consolidated list such as those discussed herein can be presented to a user (also referred to as a requestor) using any of a variety of user interface configurations. Additionally, items in such a consolidated list can include specific attributes which depend on the view of the requestor, such as for example visibility, language, locale-specific representation, or the like. List items to be presented to a given requestor in a requestor-specific consolidated list can be determined using the results of queries to multiple backend systems (also referred to herein as provider systems). If items in the consolidated list are dynamically or concurrently updatable based on actions that occur at their respective provider systems, by various background processes, and/or on the interactions of more than one user, the existence and/or state of items in the consolidated list presented to a given requestor can change during a single work session of the requestor. As a result, the parts of a consolidated list presented by such software are generally not stable and are highly dependent on the identity of the requestor. Caching of items as a static consolidated list is therefore not typically a viable approach.

As used herein, a requestor system generally includes a client application (which can be a web application, a local application, or the like), which sends a sequence of requests to the central hub system containing one or more of filtering criteria and sorting criteria. Both types of criteria are related to attributes of potential items that a user of the requestor system (e.g. a requestor) desires to receive.

Figure 1:
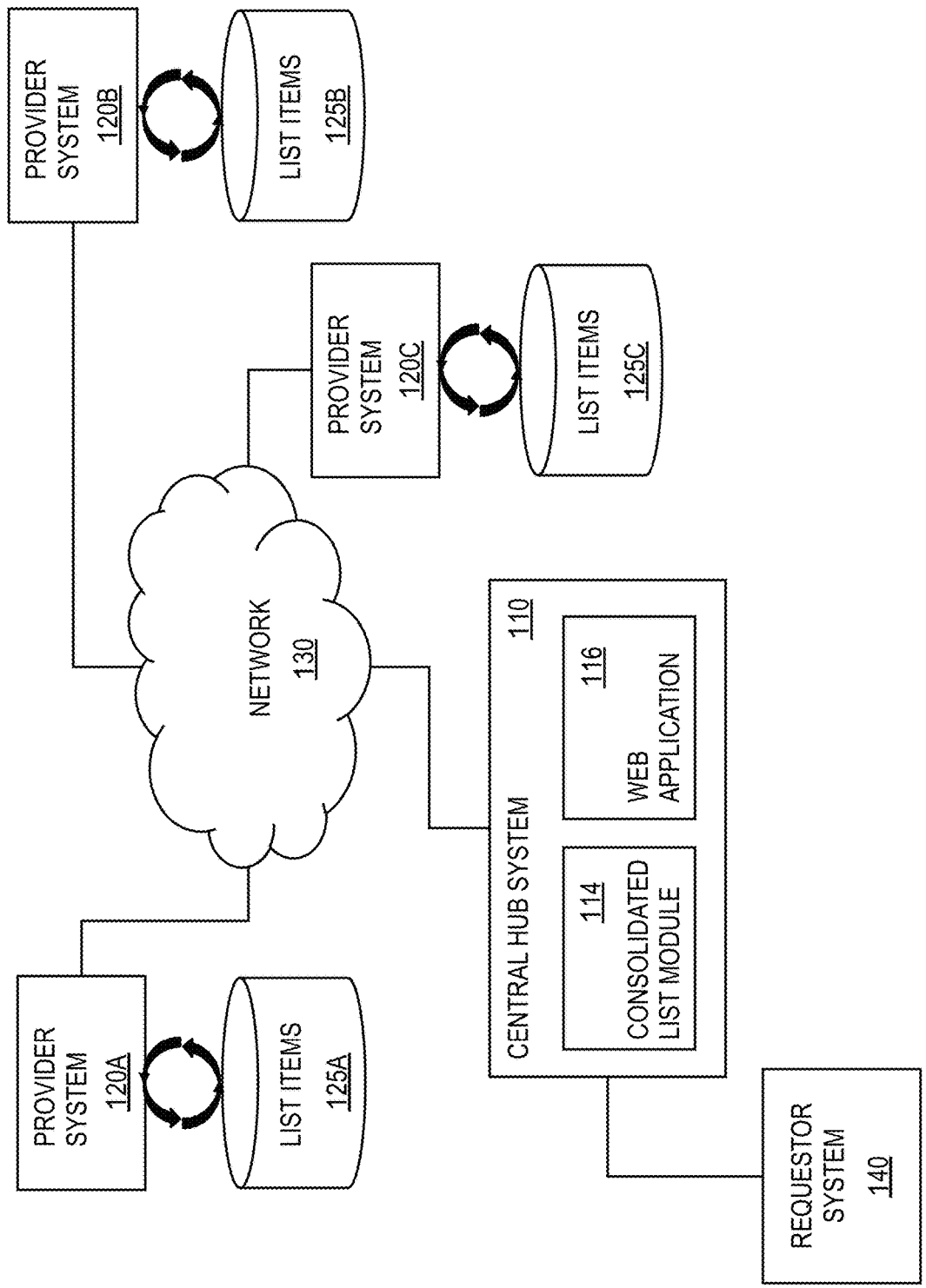
FIG. 1 shows a diagram illustrating aspects of a computing architecture showing features consistent with implementations of the current subject matter.

A requestor using integration software such as that discussed herein generally does not directly access all of the individual provider systems. Rather, a consolidated list and the user interface within which it is presented may be generated by another system, which can be referred to as a central hub system. FIG. 1 shows a diagram illustrating an example computing architecture 100 that can support such an approach. As shown in this example, a central hub system 110 can include a "consolidated list module" 114 which generically refers to software that accesses various provider systems 120A, 120B, 120C in this example with three provider systems to obtain information necessary to generate a consolidated list for display to a requestor at a requestor system 140, which can be any kind of computing device. The central hub system 110, as well as any or all of the provider systems 120A, 120B, 120C and the requestor system 140, can include one or more web applications or other locally executing applications that provide one or more of the features discussed herein. The provider systems 120A, 120B, 120C can access one or more databases 125A, 125B, 125C or other sources or repositories form which items for inclusion in lists can be accessed, generated, etc.

In some examples, it will be understood that the requestor system 140 can be the central hub system 110. Communications between the provider systems 120A, 120B, 120C and the central hub system 110 can occur via a network 130, which can include any type of inter-system communications (e.g. wireless or wired networks, wide area or local arena networks, the Internet, etc.), or by a direct communication link (e.g. If the requestor system 140 and the central hub system 110 are not the same system, communication between them can likewise occur by any kind of networked or direct communication link, possibly including but not limited to the network 130. In the example of FIG. 1, the central hub system 110 may not administer or supply information about any of the items presented in the consolidated list, but can instead access a plurality of provider systems to acquire the necessary data to generate and present a unified list of items that can be filtered and sorted by criteria specified by a requestor system 140. As discussed in further detail below, these criteria can relate to the attribute of potential items.

In other examples, the consolidated list and the user interface within which it is presented may be generated by one of the provider systems (120A, 120B, 120C in the example of FIG. 1) acting as the central hub system. A provider system acting as the central hub system can administer and supply information about a subset of the items available for presentation to a requestor in a consolidated list and can in turn access other provider systems to acquire data supporting various additional items for presentation in the consolidated list. As with the central hub system example, the provider system can access other provider systems over any kind of networked or direct communication link and can similarly be accessed by a requestor system via any kind of networked or direct communication link.

Because multiple requestor systems are possible, and because these requestor systems can be remote from the central hub system 110 (e.g. in terms of distance, network barriers, etc.), the time to query items (and any associated metadata) for inclusion from multiple provider systems can be variable and difficult to predict, as can the necessary system, network, and client resources necessary to do so. It is also generally not readily predictable by the requestor system when setting filters or other query criteria for items to include in a consolidated list whether or how much the total amount of matching items can be reduced to a usable, conveniently presentable volume of items. As such, it can be advantageous for integration software with the capability of providing consolidating lists to multiple requestors to also be able to present such lists in a stably paginated manner. As used herein, stably paginated refers to a feature whereby the consolidated list is presented to a requestor as a series of pages, each having a set number of items on it. When the user navigates through the pages (e.g. from one page in the series to another and either forward or back in the series of pages), a querying approach as described below can be used to determine the correct content to present on the next displayed page.

Accordingly, implementations of the current subject matter can provide one or more advantages relating to generating and displaying a consolidated list of items to a requestor. In an example in which items available to be presented to multiple requesters originate from more than one different provider system, and in which the multiple requestors access items (and can cause individual items to change, be removed, etc. through various actions) via their own customized consolidated lists (which include items that also appear in other requestors' customized consolidated lists) supported by a central hub system, the contents of the customized consolidated list to be presented to a specific requestor can undergo a number of changes during a single work session. The integration software used to present the consolidated list may also support requests from a requestor to view all or, alternatively, a subset of the total amount of all available items by specifying filter and sorting criteria. In such an example, the returned list items to be presented in the consolidated list may be divided into several pages to allow paginated viewing of the list. The requestor can first view the first page of the series of pages and then use navigation controls to view subsequent pages.

Figure 2:
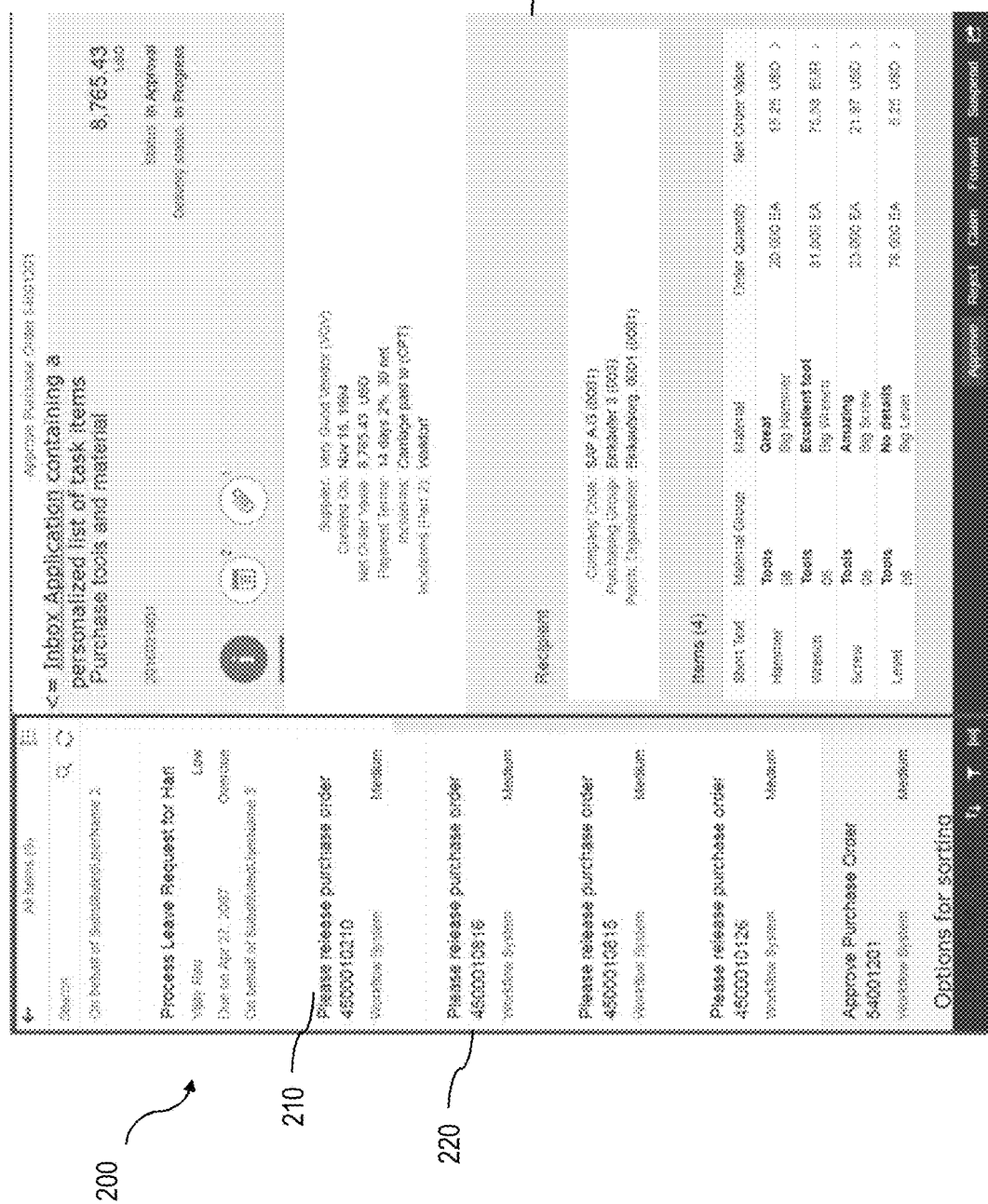
FIG. 2 shows a screenshot view illustrating features consistent with some implementations of the current subject matter.

FIG. 2 shows an example user interface view 200 in which a consolidated list 210 is displayed. In this example, the consolidated list 210 appears in a first pane 220 on the left side of the user interface view 200. A second pane 230 includes user interface features relating to a selected item in the consolidated list 210. Controls near the bottom of the consolidated list (which can be placed at other locations as well) allow a requestor to sort and filter the list items according to different criteria and to navigate through a series of pages upon which the list items are contained.

Consistent with implementations of the current subject matter, a common stateless pagination protocol can be established between provider systems, a central hub system (which can be one of the provider systems), and one or more requestor systems. This common stateless pagination protocol can support several useful features. As noted before, different sets of list items are provided by each of the provider systems. The hub system merges these items so that it can deliver a consolidated list (according to any requested filter and sort criteria) to an individual requestor. Each requestor is provided with an individual view (e.g. a customized consolidated list) with individual characteristics on the work list items. Items can be added, changed, and removed frequently, such that the list item content of a consolidated list generated for a given requestor is not stable. The overall list of all items a requestor could request can become very huge, such that multiple requestor systems making frequent calls for updates to list item content could possibly exceed limits and capacities of the involved infrastructure and systems. The central hub system and the provider system(s) can be stateless in sense of not storing any state across requestors' requests.

Use of a pagination approach as mentioned above and discussed in more detail below can be useful in limiting the amount of entries per request. This pagination approach can split the list of items visible to a given requestor into different pages which are requested step-by-step by the requestor. In other words, as a requestor navigates to a next page in a series of pages, a new query is made. This new query needs be targeted only at the list item content that could possibly appear on the next page to be displayed according to the requestor's navigation choice.

While there pagination approaches exist, a distributed setup that includes multiple provider systems may not be compatible with currently available pagination concepts utilizing features including counting, offset, and page tops. Such existing concepts can suffer from the following problems. Counting the total amount of items to be displayed to a requestor might not be adequate as the amount of items can change between two requests. As the amount of items can vary between two paging requests of the same requestor, taking the top-most n items based on an offset between a current page and a next page risks losing control of correct page boundaries. For example, if pages are determined to always hold 10 items such that the first item in a page is always some multiple of 10 items plus 1 (e.g. page 1 starts at item 1, page 2 starts with item 11, etc.), duplicate or skipped items between two requests will occur if items are added to or removed from the list between or during requests to navigate to a next page in the series.

Implementations of the current subject matter can address this issue with features that allow "deterministic" forward and backward paging within a series of pages. In other words, at a given point in time, the same list items should appear on the same pages when a user navigates between pages. While items may be removed and/or added, remaining items should remain on the same page. In this manner, for example, removal of an item from page 1 that occurs while a user is viewing page 1 does not lead to "skipping" of a first item that would have previously appeared on page 2 when the requestor navigates to page 2. Currently available pagination approaches are generally based on counting the amount of items, dividing the list by the amount of a page size. Next pages are requested by providing the amount of already visited items, plus the amount of the next portion of requested items. For example, in existing DBMS systems, paging offsets are usually formulated with SQL commands like TOP and SKIP. Such existing pagination approaches generally do not fulfill the aforementioned requirements.

One approach to address the above noted issues is use of an extended stateful approach in which a whole result list of items is persisted as a kind of snapshot into a separate table with session-based temporary content in order to guarantee stable paging. However, this approach may suffer from aging of the persisted data during navigation by the requestor from page to page, thereby causing the presented list items to be outdated.

Referring again to FIG. 1 an example of operations involved in an implementation of the current subject matter, a requestor system 140 sends a request to retrieve a list of task items to the central hub system 110. The central hub system 110 forwards the request to each provider system 120A, 120B, 120C along with information specifying a page size to be used in displaying a consolidated list on the requestor system 140. The page size is discussed in more detail below. The provider systems 120A, 120B, 120C return relevant results based on one or more filter criteria, page sizing guidelines, and the like. The individual results returned by the provider systems 120A, 120B, 120C are merged and consolidated list by the central hub system 110, for example using an efficient algorithm such as a sorted merge. If the consolidated list includes more than a requested amount of items (e.g. more items than the page size), the resulting list is truncated to the size of one page and returned to the requestor system for display.

In order to guarantee correct and accurate paging, additional cooperation between the requestor system 140, the central hub system 110, and the provider systems 120A, 120B, 120C. Particular aspects or features necessary to implement an approach consistent with the current subject matter of the provided algorithm can be implemented in the one or other components. A requestor system 140 can parameterize the retrieval of items in a consolidated list using one or more of the following and/or other criteria: by requestor identity (e.g. retrieving only those items related to the requestor), as a list of filter criteria (e.g. to reduce the amount of returned items), as a list of sorting criteria, and the size of the list per page (e.g. an expected number of items provided by the list at maximum, which could be less in case there are no further items available).

A list of sorting criteria can include a prioritized list of attributes of retrieved items which are used to logically sort the retrieved items when they are provided. In general, a first sorting criterion appearing before a second sort criterion has higher precedence in sorting. A sorting criteria can also specify in which direction (e.g. ascending, descending, any other, . . . ) the ordering should be applied.

The size of the list can define the size of a logical page. After having requested and received the initial page and requesting subsequent pages (if any are available), the requestor system can provide further parameters in the next request. For example, additional filter criteria can provide particular values of the last item of the current page. Those additional parameters can be derived from the list of sorting criteria and their value of the last item available in the current page.

Performing such operations can involve the requestor requesting the list of items to be ordered deterministically by zero, one, or more common attributes of the items. In addition, the items are advantageously ordered by a lexicographically and deterministically sortable item identifier, which may not necessarily be part of the business attributes of the item. This item identifier needs to be unique for all items originating from the same provider system. However they do not need to be necessarily unique across all provider systems. For example, an item identifier fulfilling this requirement could be an increasing number or a GUID.

With the following description of operations, an example implementation of the current subject matter is explained based on an SQL-like query. However, it will be understood that the current subject matter also applies to any other approach for performing a logical query that can be implemented in a computer. Assuming that a set of n order criteria are defined by a requestor, n+1 order criteria are specified towards the query to the provider systems, which includes an item identifier in addition to the order criteria. In addition to specifying the order criteria in an ORDER BY clause, for example in SQL, the order criteria also results in additional filter criteria being added to those which specified by the requestor. For example, n+1 sorting criteria shall result in n+1 OR criteria e.g. in a SQL WHERE clause.

An SQL-style query statement on the provider systems therefore can therefore include the following components:
SELECT * from Items WHERE
$CUSTOM_FILTER_CRITERIA
AND ($OR_CRITERIA_DUE_TO_ORDER_BY)
ORDER BY $CUSTOM_OR_CRITERIA, $ITEM_ID The $OR_CRITERIA_DUE_TO_ORDER_BY criteria are a list of criteria on the items' attributes depending on the provided order criteria. The groups are connected via OR, and all over they are connected via AND with the filter criteria provided initially by the requestor system. Depending on the precedence of the given order criteria, within an OR criterion a comparison of the order criteria with its value of the last item shown at the current page is performed.

FIG. 3 shows a table 300 that includes examples of building rules for n order criteria (ascending or descending) resulting in n+1 $OR_CRITERIA_DUE_TO_ORDER_BY criteria. The table 300 includes columns for each of a set of n attributes as well as an additional column for the item identification. The rows indicate priority of sorting on each attribute and the item identifier.

Figure 4:
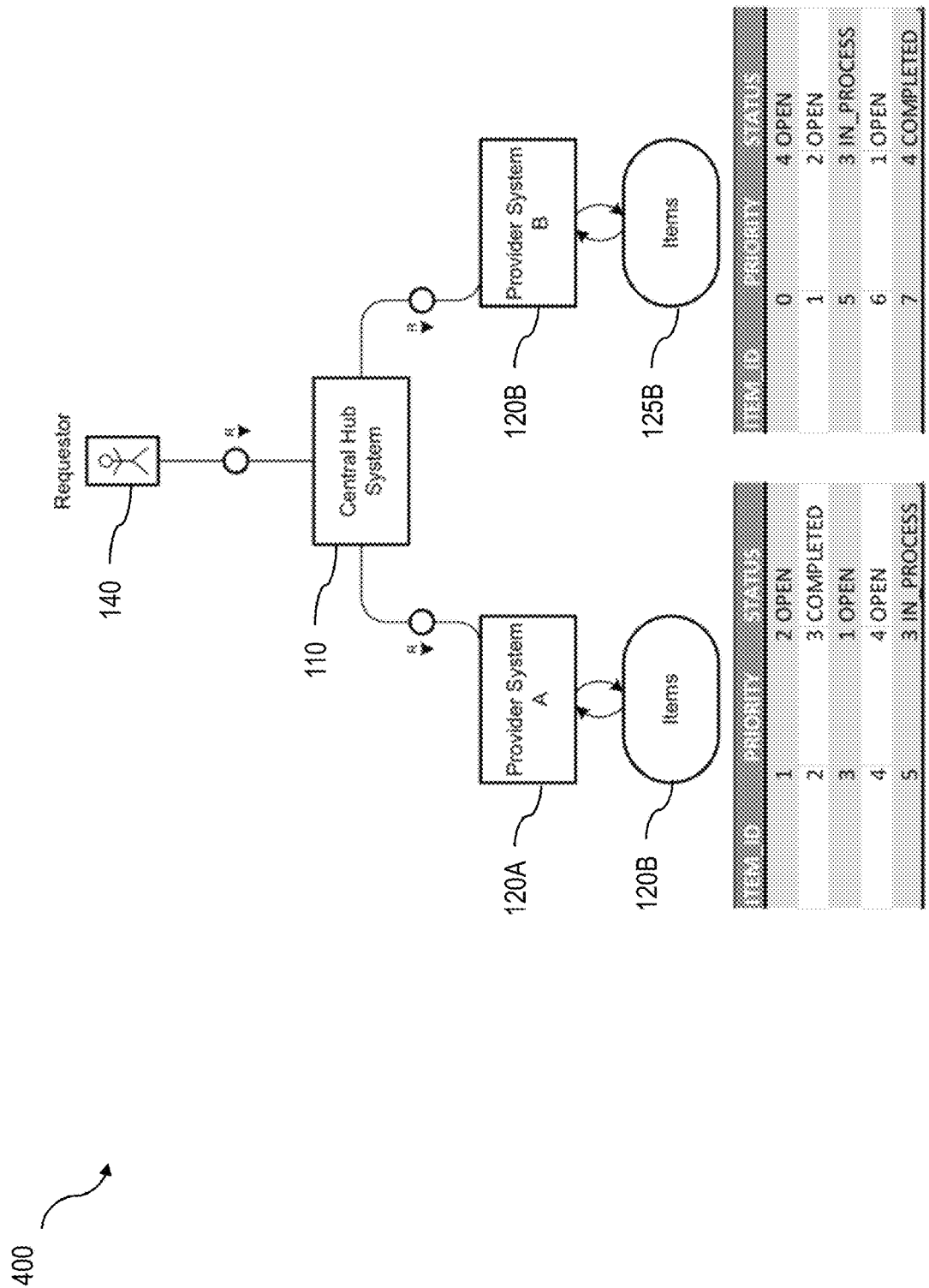
FIG. 4 shows a diagram illustrating aspects of a system showing features consistent with implementations of the current subject matter.

As an example a query on sorting based on criteria Attr1 ASC, Attr2 DESC,
SELECT * from Items WHERE
(Attr1>'B') OR
(Attr1='B' AND Attr2<'Z') OR
(Attr1='B' AND Attr2='Z' AND ITEM_ID>2)
ORDER BY Attr1 ASC, Attr2 DESC, ITEM_ID FIG. 4 shows an example of a system architecture consistent with implementations of the current subject matter in which two provider systems 120A, 120B. Given is an example landscape with two Provider Systems, Provider System A and Provider System B. Both Provider Systems are connected with the same Central Hub System. The each of the Provider Systems contains five individual items.

A requestor system sends requests to the central hub system 110 to retrieve a consolidated paged list containing the items of the two provider systems 120A, 120B. The amount of items to get retrieved per request (i.e. page) in this example is three items. The requestor system 140 sends a request to retrieve all items sorted by PRIORITY ascending, STATUS ascending. This query can take the form of "select * from ITEMS order by PRIORITY ascending, STATUS ascending."

Assuming that each provider system has at least three items that meet the criteria, the requestor 140 system would, upon receipt of the results from the two provider systems 120A, 120B have an overall quantity of items equal to six. However, as the page size (i.e. the quantity of items to be shown on one page) is three, this result would be sufficient to fill two pages. In an arrangement in which multiple different provider systems have volatile data (e.g. the items that might be provided in response to a list assembly query from a requestor system 140 as described above), it may not be possible for one or more of the provider systems to accurately calculate (or even estimate) an absolute number of items to be returned. To address this issue a distributed query approach as discussed below can be used consistent with implementations of the current subject matter.

In this approach, when receiving the request for the first page from the requestor system 140, the central hub system 110 can direct the query with the further parameter of the page size (e.g. number of items to be displayed per page) specified by the requestor system 140 to each of the provider systems 120A, 120B. FIG. 5A and FIG. 5B show tables 500, 550 respectively listing what is returned as the first three items (in this example with a page size of three) by each of the provider systems 120A, 120B.

The central hub system 110 merges the list using an optimized algorithm (e.g. a merged sort) according to the query's sorting priorities. The table 600 of FIG. 6A shows the full result list from this example, while the table 650 of FIG. 6B shows the result list truncated to the length of a page, which in this example is three items. The truncated result list is then used as the content of the first page presented to the requestor system 140 for display to a user.

From the perspective of the requestor system 140, the second page is supposed to provide three further items following (based on the order criteria) the last item A/1/2/OPEN provided by the first page. Therefore, the last item's data is the basis for the query for the second page.

For a next page in the series of pages upon which the consolidated list is presented, those items appearing on the first page should be excluded to avoid duplicate entries. In this example, the provider system A 120A supplied the last item A/1/2/OPEN in the truncated list 650 of items for inclusion on page 1, so a query for list items to be included on the next page (e.g. page 2) advantageously requests all items using an excluding operator (> or "greater than") the ITEM_ID 1 as it was provided already on the first page. The other query parameters are a result of a cascading of the sorting parameter according to their priorities, as shown in the listing 700 of query and sorting parameters in FIG. 7A. The table 750 of FIG. 7B shows a result of this query at the provider system A 120A.

In contrast, the provider system B 120B was not the provider of the first page's last item A/1/2/OPEN. Therefore, the query for the second page used an including operator (≥= or "greater than or equal to") the ITEM_ID of the last entry as it might be the case that the given entry was not yet shown at the first page (as the ITEM_IDs of the Provider Systems are not disjunct). Therefore, the provider system B 120B executes a query according to the listing 800 of query and sorting parameters shown in FIG. 8A, which is the same except for the ≥operator when it comes to the comparison with the ITEM_ID. The table 850 in FIG. 8B shows a result of this query at the provider system B 120B.

Figure 9:
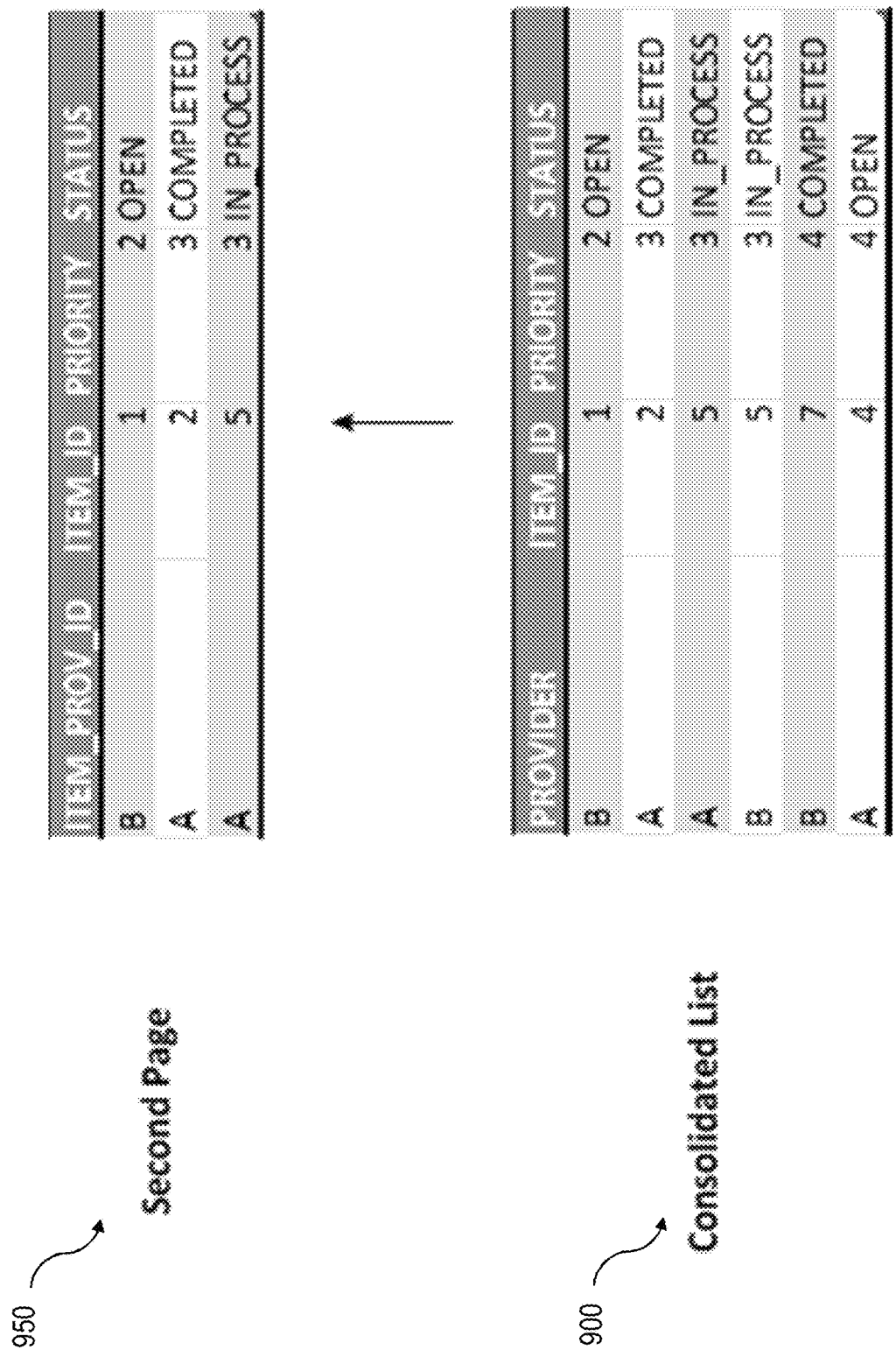
FIG. 9 shows tables of all results and a results list truncated to a size of a page for a query for the next page in the series of pages consistent with the example implementation.

The results provided by all of the provider systems (in this example, provider system A 120A and provider system B 120B) are consolidated by the central hub system 110. The lower table 900 in FIG. 9 shows all of the results combined for the two provider systems. The results are truncated to three (the number of items per page) in the upper table 950 of FIG. 9.

Retrieval of further pages (e.g. a third page, etc.) can be performed in a similar manner to that described above for page 2. In general, for pages after the first page (in other words, pages for which there is a preceding page), a query to the provider system that provided the last list item on the page preceding the current page uses an excluding operator such that any sorting or filtering criteria designate greater than (or less than if the sort is inverted) rather than an inclusive operator such as greater than or equal to or less than or equal to.

If a request is received from the requestor system 140 to navigate back, for example from the second to the first page, the approach described above works in the inverse direction as for forward navigation for both comparing and ordering.

Figure 10A:
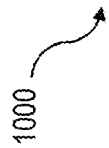
FIG. 10A and FIG. 10B respectively show listings of query and sorting parameters for a provider system providing the last or first item on a preceding page and for other provider systems consistent with the example implementation.

In the example used above, when the requestor system request a backward navigation from the second page to the first page, the query of the provider systems 120A, 120B is based on the first item of the second page (e.g. rather than the last item of the preceding page). In this example, the first item of the second page is item B/1/2/OPEN, which was provided by the provider system B 120B. Accordingly, the provider system B 120B queries for all items excluding (this time inverse operator: <) the ITEM_ID 1 as it was provided already on the second page. The other query and sorting parameters are a result of a cascading of the sorting parameter according to their priorities; but all inverted compared to the forward navigation as shown in the listing 1000 of query and sorting parameters shown in FIG. 10A.

Figure 10B:

However, the provider system A 120A was not the provider of the second page's last item B/1/2/OPEN and its provider number is lower than that of the provider system B 120B. Therefore, the query for the second page includes (now inverted: ≤) the ITEM_ID of the last item on the previous page. Therefore, the provider system A 120A executes a query according to the listing 1050 of query and sorting parameters shown in FIG. 10B, which is the same as the listing 1000 in FIG. 10A except for the ≤operator when it comes to the comparison with the ITEM_ID.

Due to the artificially inverted sorting criteria used in the queries of the given example, in all provider systems the order of the resulting items needs to be inverted. This can be performed using the same algorithm as used by the database query when performing the initial sorting. In the central hub system 110, merging the results of the individual provider systems can occur in the same manner as in the case of the forward navigation.

As the items get processed, it might happen that items disappear or new ones appear in the list. So when reaching the top of the list (first entry) again, the amount of items might not cover the page size. The requestor system 140 can recognize this situation by counting the size of the result. In a case in which the requestor system is not configured to allow a lower number of entries per page that the page size, the requestor system can call the first page again as in an initial construction of the page series for the list.

Figure 11:
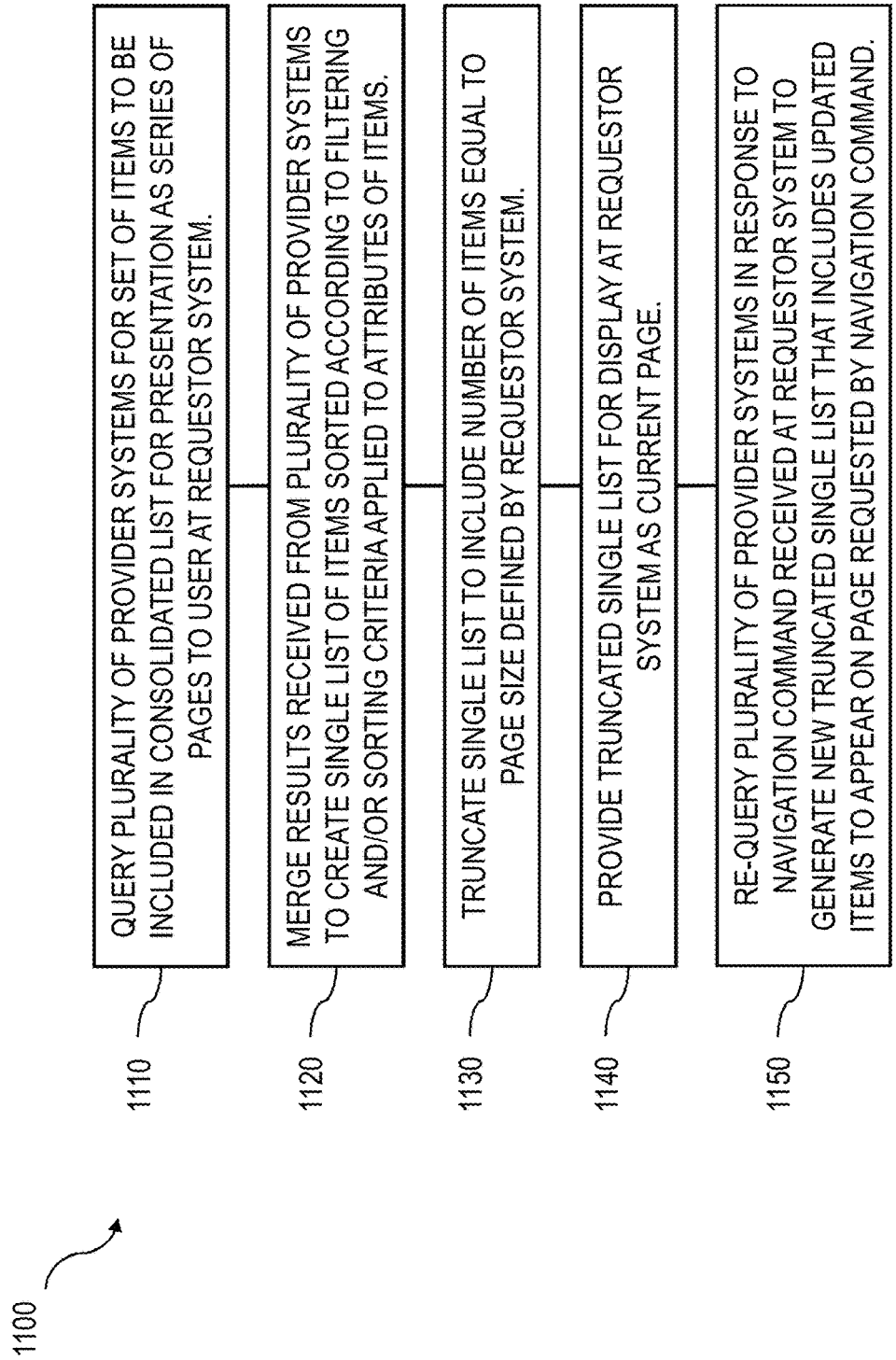
FIG. 11 shows a process flow diagram illustrating aspects of a method having one or more features consistent with implementations of the current subject matter.

FIG. 11 shows a process flow chart 1100 illustrating features that can be present in one or more implementations of the current subject matter. At 1110, a plurality of provider systems is queried for a set of items to be included in a consolidated list for presentation as a series of pages to a user at a requestor system. The querying includes providing one or more filtering and/or sorting criteria that are to be applied to attributes of the items at the provider systems.

At 1120, the results received from the plurality of provider systems are merged to create a single list of items sorted according to the one or more filtering and/or sorting criteria applied to attributes of the items. This single list is truncated at 1130 to include a number of items equal to a page size defined by the requestor system, and the truncated single list is provided for display at the requestor system as a current page at 1140.

At 1150, the plurality of provider systems is re-queried in response to a navigation command received at the requestor system. The re-querying includes dynamically generating a new truncated single list that includes updated items to appear on a page requested by the navigation command. When the navigation command includes a request to navigate to a next page in the series of pages, the re-querying of the plurality of provider systems includes requesting that a provider system of the plurality of provider systems from which a last item on the current page was received provides next items according to the one or more filtering and/or sorting criteria starting from but excluding the attributes of the last item and that any other provider systems of the plurality of provider systems provide next items starting from the attributes corresponding to the last item. On the other hand, when the navigation command includes a request to navigate to a preceding page in the series of pages, the re-querying of the plurality of provider systems includes requesting that a provider system of the plurality of provider systems from which a first item on the current page was received provides preceding items according to the one or more filtering and/or sorting criteria ending at but excluding the attributes of the first item and that any other provider systems of the plurality of provider systems provide preceding items ending at the attributes corresponding to the first item.

The navigation command includes a request to navigate to a next page in the series of pages (e.g. either forward or back in the series of pages). The re-querying includes requesting that a provider system of the plurality of provider systems from which a last item on the current page was received provides next items according to the one or more filtering and/or sorting criteria starting from but excluding the attributes of the last item and that any other provider systems of the plurality of provider systems provide next items starting from the attributes corresponding to the last item. In this context, the last item would be the item at the bottom of a current page for forward navigation (e.g. going from a first page to a second page, a second page to a third page, etc.) or an item at the top of a current page for backward navigation (e.g. going from a second page to a first page, a third page to a second page, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
   querying a plurality of provider systems for a set of items to be included in a consolidated list for presentation as a series of pages to a user at a requestor system, the querying comprising providing one or more filtering and/or sorting criteria;
   merging results received from the plurality of provider systems to create a single list of items sorted according to the one or more filtering and/or sorting criteria applied to attributes of the items;

truncating the single list to include a number of items equal to a page size defined by the requestor system;

providing the truncated single list for display at the requestor system as a current page; and re-querying the plurality of provider systems in response to a navigation command received at the requestor system, the re-querying comprising dynamically generating a new truncated single list that includes updated items to appear on a page requested by the navigation command;

wherein the navigation command comprises a request to navigate to a next page in the series of pages, wherein the re-querying of the plurality of provider systems comprises:

transmitting a first query to a first provider system of the plurality of provider systems from which a last item on the current page was received, the first query requesting that the first provider system provides next items according to the one or more filtering and/or sorting criteria starting from but excluding the attributes of the last item, and transmitting a second query to other provider systems of the plurality of provider systems, the second query requesting that the other provider systems provide next items starting from and including the attributes corresponding to the last item on the current page, and wherein the sorting criteria includes a priority of sorting on each attribute.

2. A computer program product as in claim 1, wherein the navigation command comprises a request to navigate to a preceding page in the series of pages, and wherein the re-querying of the plurality of provider systems comprises requesting that a provider system of the plurality of provider systems from which a first item on the current page was received provides preceding items according to the one or more filtering and/or sorting criteria ending at but excluding the attributes of the first item and that any other provider systems of the plurality of provider systems provide preceding items ending at the attributes corresponding to the first item.

3. A computer program product as in claim 1, wherein the querying comprises requesting, from each provider system of the plurality of provider systems, a number of items equal to the page size that match the one or more filtering and/or sorting criteria provided from the requestor system.

4. A computer program product as in claim 1, wherein the filtering and/or sorting criteria comprise sorting criteria that include an ordering of item identifiers for items at the plurality of provider systems.

5. A computer program product as in claim 4, wherein the item identifiers are not globally unique.

6. A computer program product as in claim 1, wherein the first provider system performs the first query including executing the first query using an excluding operator; and wherein the other provider systems perform the second query including executing the second query using an including operator.

7. A system comprising:

computing hardware configured to perform operations comprising:

querying a plurality of provider systems for a set of items to be included in a consolidated list for presentation as a series of pages to a user at a requestor system, the querying comprising providing one or more filtering and/or sorting criteria;

merging results received from the plurality of provider systems to create a single list of items sorted according to the one or more filtering and/or sorting criteria applied to attributes of the items;

truncating the single list to include a number of items equal to a page size defined by the requestor system;

providing the truncated single list for display at the requestor system as a current page; and re-querying the plurality of provider systems in response to a navigation command received at the requestor system, the re-querying comprising dynamically generating a new truncated single list that includes updated items to appear on a page requested by the navigation command;

wherein the navigation command comprises a request to navigate to a next page in the series of pages, wherein the re-querying of the plurality of provider systems comprises:

transmitting a first query to a first provider system of the plurality of provider systems from which a last item on the current page was received, the first query requesting that the first provider system provides next items according to the one or more filtering and/or sorting criteria starting from but excluding the attributes of the last item, and transmitting a second query to other provider systems of the plurality of provider systems, the second query requesting that the other provider systems provide next items starting from and including the attributes corresponding to the last item on the current page, and wherein the sorting criteria includes a priority of sorting on each attribute.

8. A system as in claim 7, wherein the navigation command comprises a request to navigate to a preceding page in the series of pages, and wherein the re-querying of the plurality of provider systems comprises requesting that a provider system of the plurality of provider systems from which a first item on the current page was received provides preceding items according to the one or more filtering and/or sorting criteria ending at but excluding the attributes of the first item and that any other provider systems of the plurality of provider systems provide preceding items ending at the attributes corresponding to the first item.

9. A system as in claim 7, wherein the querying comprises requesting, from each provider system of the plurality of provider systems, a number of items equal to the page size that match the one or more filtering and/or sorting criteria provided from the requestor system.

10. A system as in claim 7, wherein the filtering and/or sorting criteria comprise sorting criteria that include an ordering of item identifiers for items at the plurality of provider systems.

11. A system as in claim 10, wherein the item identifiers are not globally unique.

12. A system as in claim 7, wherein the first provider system performs the first query including executing the first query using an excluding operator; and wherein the other provider systems perform the second query including executing the second query using an including operator.

13. A computer-implemented method comprising:

querying a plurality of provider systems for a set of items to be included in a consolidated list for presentation as a series of pages to a user at a requestor system, the querying comprising providing one or more filtering and/or sorting criteria;

merging results received from the plurality of provider systems to create a single list of items sorted according to the one or more filtering and/or sorting criteria applied to attributes of the items;

truncating the single list to include a number of items equal to a page size defined by the requestor system; and providing the truncated single list for display at the requestor system as a current page; and re-querying the plurality of provider systems in response to a navigation command received at the requestor system, the re-querying comprising dynamically generating a new truncated single list that includes updated items to appear on a page requested by the navigation command;

wherein the navigation command comprises a request to navigate to a next page in the series of pages, wherein the re-querying of the plurality of provider systems comprises:

transmitting a first query to a first provider system of the plurality of provider systems from which a last item on the current page was received, the first query requesting that the first provider system provides next items according to the one or more filtering and/or sorting criteria starting from but excluding the attributes of the last item; and transmitting a second query to other provider systems of the plurality of provider systems, the second query requesting that the other provider systems provide next items starting from and including the attributes corresponding to the last item on the current page, and wherein the sorting criteria includes a priority of sorting on each attribute.

14. A computer-implemented method as in claim 13, wherein the navigation command comprises a request to navigate to a preceding page in the series of pages, and wherein the re-querying of the plurality of provider systems comprises requesting that a provider system of the plurality of provider systems from which a first item on the current page was received provides preceding items according to the one or more filtering and/or sorting criteria ending at but excluding the attributes of the first item and that any other provider systems of the plurality of provider systems provide preceding items ending at the attributes corresponding to the first item.

15. A computer-implemented method as in claim 13, wherein the querying comprises requesting, from each provider system of the plurality of provider systems, a number of items equal to the page size that match the one or more filtering and/or sorting criteria provided from the requestor system.

16. A computer-implemented method as in claim 13, wherein the filtering and/or sorting criteria comprise sorting criteria that include an ordering of item identifiers for items at the plurality of provider systems.

17. A computer-implemented method as in claim 16, wherein the item identifiers are not globally unique.

* * * * *